United States Patent

Plakosh et al.

[11] Patent Number: 5,860,143
[45] Date of Patent: Jan. 12, 1999

[54] REAL-TIME IMAGE DATA ACCESS FROM VIRTUAL MEMORY IN A DIGITAL PRINTING SYSTEM

[75] Inventors: David Plakosh, Rochester, N.Y.; Juan A. Romano, North Hills; Frederic J. Stann, Moorpark, both of Calif.; Michael A. Wiegand, Webster, N.Y.; Norman E. Wright; Mark A. Smith, both of Rochester, N.Y.; Steven E. Chen, Penfield, N.Y.; Michael C. Lacagnina, Walworth, N.Y.

[73] Assignee: Xerox Corporation, Stamford, Conn.

[21] Appl. No.: 659,969

[22] Filed: Jun. 3, 1996

[51] Int. Cl.⁶ ........................................... G06F 12/10
[52] U.S. Cl. .................. 711/206; 711/145; 711/163; 395/115
[58] Field of Search ................... 395/115; 711/207, 711/163, 145, 206

[56] References Cited

U.S. PATENT DOCUMENTS

| 4,727,485 | 2/1988 | Keshlear et al. | 711/207 |
| 5,386,579 | 1/1995 | Bourekas et al. | 711/123 |
| 5,664,161 | 9/1997 | Fukushima et al. | 711/202 |

*Primary Examiner*—Reginald G. Bragdon
*Attorney, Agent, or Firm*—R. Hutter

[57] ABSTRACT

In a real-time printing system, in which large blocks of digital data corresponding to page images must be located in a memory via a translation table and accessed from the memory within a very narrow time frame, the memory-management internal program of an operating system is overridden by external instructions which lock the translation table in memory.

2 Claims, 2 Drawing Sheets

REAL-TIME IMAGE DATA ACCESS FROM VIRTUAL MEMORY IN A DIGITAL PRINTING SYSTEM

FIELD OF THE INVENTION

The present invention relates to a technique for accessing data, such as image data for a digital printing system, from virtual addresses in a computer memory. More specifically, the present invention relates to controlling a UNIX® operating system with special commands to avoid delays in the transference of data from a memory.

BACKGROUND OF THE INVENTION

In computer science, high speed digital printing presents unique requirements to data-processing equipment. To operate a printing apparatus which is designed to output over 100 page-size images per minute, the ability to make the desired image data available to printing hardware requires very close tolerances in the management of the "overhead" when data is transferred from memory to printing hardware. A typical 600 spi letter-size page image, in a format suitable to be submitted to printing hardware, is typically of a size of about 4 MB; when the printing hardware demands the image data to print the particular page, this 4 MB of image data must be accessed from real memory within a time frame of approximately 300 milliseconds.

It has been found, with standard implementation of the UNIX operating system which is common in the art, that the various protocols and other steps necessary to locate and initiate transfer of image data from a real memory, and in particular from a virtual address within a real memory, often require more time than is available once the image data is demanded by the hardware. If the image data does not reach the hardware in time, typically a blank sheet will be output from the hardware, which in turn will interfere with a large printing job. There is therefore a need for a technique by which a standard operating system, such as UNIX, can be specially adapted for real-time access of image data located at a virtual address in real memory, so that the image data can be made available to printing hardware precisely when it is needed.

SUMMARY OF THE INVENTION

According to the present invention, there is provided a method of accessing data stored in a memory having real addresses and virtual addresses associated therewith. The memory is controlled by an operating system, the operating system responding to external commands and having internal commands associated therewith. The operating system generates a translation table showing relationships between real addresses and virtual addresses in the memory. Provision is made to the operating system to accept an external command directly causing the operating system to begin executing an internal command to lock a portion of the translation table in the memory.

DETAILED DESCRIPTION OF THE INVENTION

Figure 1:
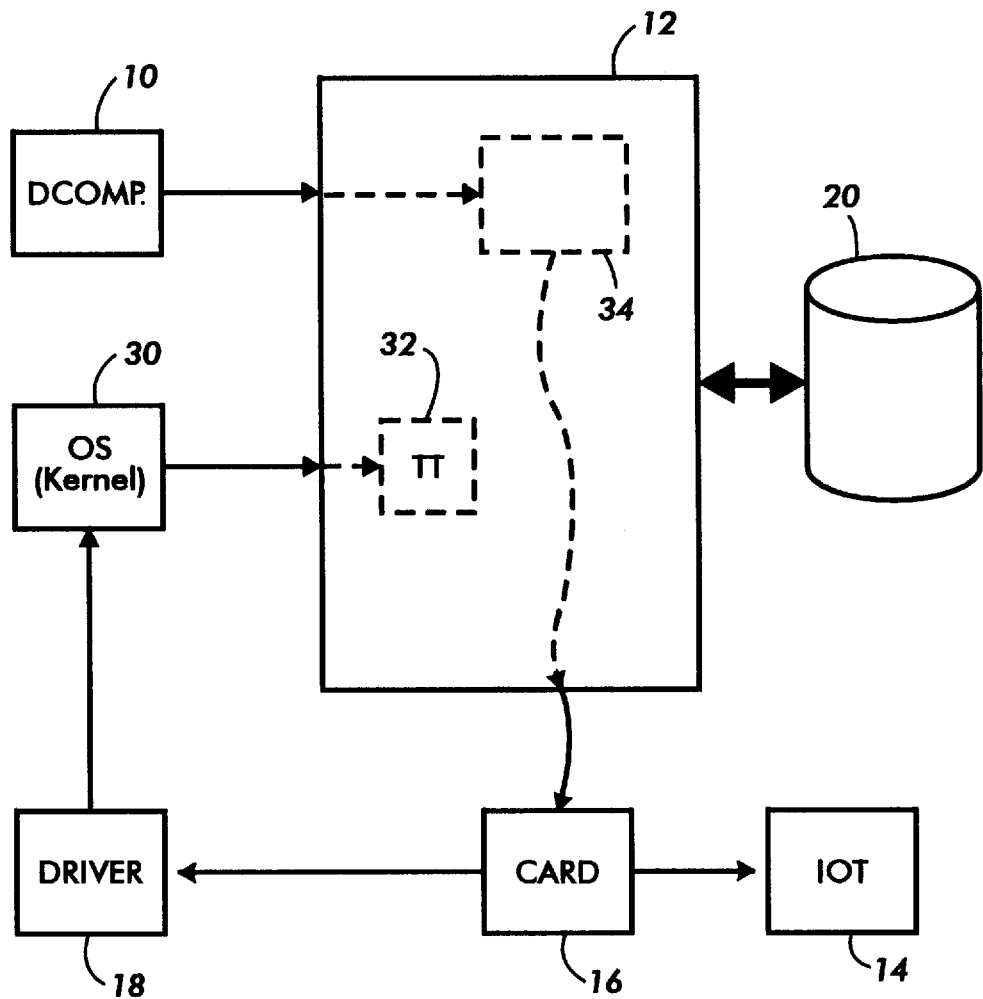
FIG. 1 is a simplified systems view showing elements of a prior-art real-time digital printing system, relevant to the present invention.

FIG. 1 is a systems view showing the various elements of a high-speed (such as from 50 to 180 prints per minute) digital printing system, as relevant to the present invention. As is well known in the art, current digital printing systems typically rely on one or more decomposers to translate image data in a PDL (page description language, such as HP-PCL, or Adobe® PostScript™) or other format (such as TIFF) into a format immediately usable by printing hardware, such as a modulating laser in an electrophotographic printer. A very high-end printing system may have several decomposers available to it, but for purposes of the present invention, any particular decomposer, such as indicated by 10, will output streams of uncompressed digital data into a real memory indicated as 12. The image data, in a form ready to be applied to printing hardware, is retained in real memory 12 until requested at a given time by the printing hardware.

The printing hardware, which is here generally referred to as an image output terminal (IOT) and indicated as 14 in FIG. 1, is controlled by printing interface hardware, which in one embodiment of the present invention is in the form of an IOT interface card 16. The card 16 carries out a direct memory access, or DMA, of a particular quantity of image data to be sent to the IOT 14, in a manner known in the art. This DMA causes the image data being accessed from memory to operate the IOT 14 in real time to create an image, such as by causing the modulation of a laser in a laser printer, or activating ejectors in a printhead in an ink-jet printer. The exact identity of the image data requested by card 16 will of course depend on what individual page image is desired to be printed at a particular time. In a typical context of real-time digital printing, the IOT 14 requests a particular set of data to be delivered to it at a specific time, such as 4 seconds into the future. In order to obtain this specific quantity of image data to print a specific page image, the card 16 forms a connection between the correct addresses holding the desired image data within real memory 12 and IOT 14. In a common practical context of real-time printing, this access to the desired data in real memory 12 must be obtained within approximately 300 milliseconds.

As is known in the art of computer science, there is an important difference between "real memory" and "virtual memory." In the example shown in FIG. 1, real memory 12 is typically in the form of a random access memory (RAM) from which data is accessible at high speed. A typical size of a real memory 12 in a real-time printing context is 128 MB. However, also common in any large data-processing context is the concept of "virtual memory." A typical real-time printing system will include 128 MB of real memory, but as much as 4 gigabytes (4 G) of virtual memory. In brief, the dichotomy between real memory and virtual memory is that, whereas real memory represents specific physical locations in a RAM, a virtual memory is a set of addresses that can be superimposed on the real memory addresses as needed for particular purposes. If data is entered into real memory 12, but is not used for a particular length of time, this data which resides in real memory 12 can be "swapped out" from real memory 12 to another memory, such as a hard disk shown as 20. When data in real memory 12 gets swapped out elsewhere in the system, it retains its virtual address, even though it has vacated the real addresses within real memory 12. When that particular swapped-out data is be retrieved, however, the data migrates from disk 20 back into real memory 12; although it may likely end up in a different location within real memory 12 than where it had originally been placed, the data is accessed from real memory 12 using its virtual, not its real, address.

It will therefore be seen that some control system must constantly keep track of virtual memory locations of particular data and map the virtual addresses to real addresses within real memory 12, so that, for example, image data can be rapidly accessed by card 16. In the UNIX environment, management of real and virtual addresses of different quantities of data (such as page image data) is controlled by the UNIX operating system, or "kernel," indicated as 30. It is a built-in function of the UNIX operating system to manage a real memory 12, decide when to write over data or swap out quantities of data to an external memory such as 20, and also maintain a "translation table" so that the kernel 30 will know what virtual addresses correspond to real addresses within real memory 12 at any given time. This translation table is generated and updated as necessary by the kernel 30 and retained in real memory 12. This translation table, indicated as 32 in FIG. 1, is needed by card 16 so that, when it is desired to retrieve a particular set of page image data having a certain virtual address, the card 16, working through the kernel 30, can look at translation table 32 to find the real address in real memory 12 which corresponds to the virtual address of a particular image data desired at a given time for sending to IOT 14. In other words, the card 16 must quickly identify the location of and access a desired quantity of data (such as shown as 34) in real memory 12, by consulting the translation table 32 and transferring the data 34 to IOT 14 within the necessary time constraints.

With conventional operation of a UNIX operating system such as kernel 30, entries for translation table 32 are generated as needed, and placed within real memory 12, where they are retained only as long as needed. As mentioned above, the kernel 30, because of its own resource-management systems, will occasionally decide to write over portions of such a translation table 32, or "swap out" certain quantities of data to an external memory such as disk 20. While it may be desirable from the standpoint of resource management to have the operating system kernel 30 have total control over the contents of real memory 12, the fact that the kernel 30 could at any time write over all or a portion of the translation table 32 (or, possibly, swap it to disk 20) presents a major practical problem in a real-time printing system when it is necessary to access the translation table 32 within a very narrow time constraint. Although UNIX will lock in the translation table 32 prior to DMA, this automatic operation cannot always be completed in real time. It is therefore desirable to override the basic resource management systems of the kernel 30 so that translation table 32 is "locked in" to the real memory 12. By so locking in the translation table 32 to real memory 12, the card 16 will not be delayed when it is desired to retrieve a quantity of data, such as 34, very quickly.

The following is a discussion of how, in the UNIX context, entries for a translation table such as 32 can be locked in to real memory 12 and not overwritten or swapped out to disk 20. Although, in the illustrated embodiment, translation table 32 is shown as a single entity, in certain operating systems such as UNIX, the translation table 32 can in fact be relatively amorphous within memory 12; that is, individual entries of a translation table 32 may be placed at various noncontiguous locations within memory 12.

The kernel 30 (here speaking of a UNIX system, although equivalent terms and commands may be found in other operating systems) relies on external instructions from, for example, driver 18, and also has its own internal commands, invisible and customarily inaccessible to the external user, by which the kernel 30 manipulates data within real memory 12, as well as performs any number of other functions. An important consideration is that, in UNIX, many of these internal commands are invisible to external users and are generally not intended to be manipulated externally.

Figure 2:
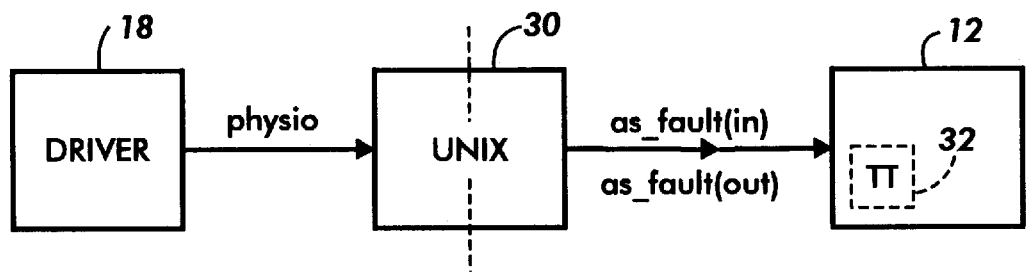
FIG. 2 is a systems view of relevant elements of a real-time printing system, illustrating a prior-art technique of accessing page image data from a real memory.
Figure 3:
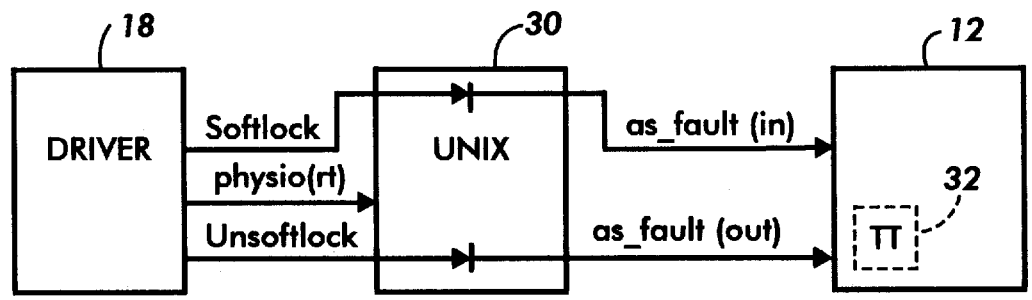
FIG. 3 is a systems view of relevant elements of a real-time printing system, illustrating a technique of accessing page image data from a real memory according to the present invention.

FIG. 2 is a simplified schematic diagram showing the relevant elements such as shown in FIG. 1 in the prior-art case when driver 18 commands the UNIX operating system to locate (through translation table 32) and ultimately retrieve a desired set of image data 34 from real memory 12; FIG. 3 shows the equivalent operation according to the technique of the present invention. First, with reference to FIG. 2, when driver 18 commands identification and retrieval of image data from real memory 12, driver 18 sends to the kernel 30 a command known as "physio", along with other identifying information. Once kernel 30 receives the physio instruction, UNIX effectively remains "in control" of the direct manipulation of data within real memory 12. Thus, in the prior art, it is the internal programs of the kernel 30 that decide exactly when the translation table 32 will be consulted to identify the real memory location of the image data desired to be retrieved. The internal instruction in UNIX, which is typically invisible to an external user, is "as_fault(in)." The as_fault(in) internal instruction has the specific function of either looking for an existing translation table entry within real memory 12, or if the entry is not available in the memory (either because it never existed, or it has been written over or swapped out) to re-generate a new translation table. In effect, the as_fault(in) instruction in UNIX is an indication that a particular set of data in real memory 12, such as translation table 32, has been labeled "do not write over." In this specific context, the as_fault(in) instruction locks the translation table 32 at a known place in real memory 12 and secures it at that location so it will not be overwritten by new data entering real memory 12, swapped out to memory 20, or otherwise invalidated.

Another internal instruction in the UNIX operating system is "as_fault(out)." The specific function of this command is to "free" the translation table 32 within real memory 12 so that it may be swapped out to an external memory, or otherwise made available to new data entering real memory 12: in brief, this instruction can be construed as an indication that a particular space in real memory 12 is "OK to write over." (In current versions of UNIX, the more precise function of as_fault(out) is to return the particular data to the state it was in before the as_fault(in) instruction. If the data in question was already locked for some other reason than the as_fault(in) instruction, the data will remain locked after the as_fault(out) instruction.) This as_fault(out) external instruction is typically the "last chapter" of internal instructions made in response to the physio external instruction used in the general case.

In currently-available versions of UNIX, there exists an instruction called "mlock," which is an external instruction which can be designated in reference to a particular set of data in memory, such as a set of data corresponding to a page image to be printed. The function of mlock is to prevent swapping of the particular designated data set. There is also an "munlock" command, which is an external command which "frees up" the designated data for swapping. While the mlock and munlock commands are suitable for locking specifically designated sets of data into real memory, these commands cannot be applied to internally-generated data in memory, such as translation table 32. Thus, although the translation table 32 is necessary for the DMA of image data from a particular space in memory, the sudden loss of a relevant entry in translation table 32 to overwriting will have a serious impact on the availability of particular image data at a particular desired time. It is thus one function of the present invention to provide a system whereby the translation table remains intact (that is, the relevant entry therein does not get written over) until the DMA of the particular image data desired is complete.

If all or a portion of the translation table 32 has been overwritten, swapped out, or otherwise invalidated in real memory 12, the kernel 30 must re-generate the translation table, which will require even more time. This time of locating or re-generating a translation table 32 thus represents an intolerable delay in the context of real-time printing. It is thus necessary that the translation table 32 (or at least a relevant entry therein) be locked in memory sufficiently in advance of when the image data it relates to is required by IOT 14.

Further, with both the as_fault(in) and the as_fault(out) instructions, the time of execution for both the as_fault(in) and as_fault(out) instructions is nondeterministic, i.e., the time consumed for carrying out the instruction cannot be predicted in advance. The as_fault(in) and as_fault(out) instructions each require shared resources, often relating to other threads, within the kernel 30, and waiting for these various resources to become available will depend on other functions taking place within the kernel 30 at the same time. Because of this nondeterministic nature of the time consumed by the as_fault(in) instruction, the as_fault(in) instruction cannot be relied upon for real-time operation at high speed.

FIG. 3 illustrates the technique according to the present invention. According to the present invention, when it is desired to command the kernel 30 to lock data in memory 12, instead of submitting the usual mlock instruction, there is implemented a special instruction here called "softlock." Regardless of the name of the instruction, the purpose of this instruction is to be an external command submitted to UNIX, in response to which the UNIX operating system generates an as_fault(in) internal instruction a predetermined time later. In this way, the softlock instruction effectively overrides the internal memory-management programs of the kernel 30 itself and ensures that the relevant entry in translation table 32 is located at a known location within memory 12 when needed.

A key aspect of the claimed invention is that submission of the external softlock instruction causes a start of execution of the as_fault(in) instruction. With the present invention, beginning of execution of the as_fault(in) instruction is always, if not effectively instantaneous, executed at a predictable time in the future and not executed in real time. In this way, the as_fault(in) instruction relevant to retrieve a particular page image can be executed well in advance of a particular set of data being needed for printing, such that the as_fault(in) instruction for the relevant entry in the translation table 32 is completed before the entry must be consulted for a DMA of the image data, well in advance of the precise "window" when the image data is required by the IOT 14. While the system of the present invention may not affect the absolute duration of time required to fully execute an as_fault(in) instruction, the present invention effectively removes the as_fault(in) instruction from real-time operation. It is also necessary to remove the as_fault(out) instruction to make physio a deterministic procedure.

According to one preferred embodiment of the present invention, the basic physio instruction, which in the basic case of UNIX causes a routine including the as_fault(in) and as_fault(out) instructions to be automatically executed, is replaced with a modified instruction, here called physio_rt. The physio_rt instruction works within UNIX to suppress both an as_fault(in) instruction and an as_fault(out) instruction from being automatically executed by the operating system. It has been found that, even if the special softlock instruction is used to lock in the translation table 32 beforehand, a subsequent regular physio instruction will cause an automatic execution of another as_fault(in) instruction. This extra as_fault(in) instruction is superfluous because the translation table has already been locked in; nonetheless, this extra as_fault(in) instruction consumes an indeterminate amount of time even though this instruction has nothing to do. Thus, according to a preferred embodiment of the present invention, when the softlock instruction, which forces the creation of an as_fault(in) instruction in response thereto, is used, a physio_rt instruction is sent to the kernel 30 at the precise time when the DMA is to be executed, which will avoid automatic execution of a superfluous as_fault(in) instruction.

Also according to a preferred embodiment of the present invention, there may be provided in the kernel 30 an ability to execute an "unsoftlock" instruction, "unsoftlock" being an external instruction which, when submitted to the kernel, causes an immediate (or within a fixed predetermined time) start of execution of an as_fault(out) instruction, which frees the translation table 32 for writing over. This may be useful for allowing updates of the translation table 32 as successive sets of page image data enter real memory 12 or disk memory 20.

In the context of digital printing, one key practical advantage of the system of the present invention is that the printing of a particular image can be aborted, if necessary, if it happens that a particular desired page image is not available in real memory 12. With a prior-art system, because of the narrow time constraint between physically pulling off a sheet from a stack of paper in the printing machine and bringing that sheet within range of IOT 14, a sudden discovery that the particular image data is not available is likely to be noted only after the sheet has been drawn from the stack; when this happens, there typically is no choice for the printing system but simply to pass through the blank sheet past IOT 14, because IOT 14 has no image data to work with. With the present invention, however, the system can ensure that the necessary image data to print a particular page is available in real memory 12 (and, in effect, the pipeline can be set up) by confirming the availability of the image data before a sheet is drawn from the paper supply stack.

While the invention has been described with reference to the structure disclosed, it is not confined to the details set forth, but is intended to cover such modifications or changes as may come within the scope of the following claims.

We claim:

1. A method of accessing data stored in a memory, the memory having real addresses and virtual addresses associated therewith, the memory being controlled by an operating system, the operating system responding to external commands and having internal commands associated therewith, comprising the steps of:

generating a translation table showing relationships between real addresses and virtual addresses in the memory;

causing the translation table to be retained in the memory; and providing to the operating system an external command causing the operating system to begin executing an internal command to lock a portion of the translation table in the memory;

wherein the operating system is a UNIX operating system and the external command causes the operating system to begin executing an "as_fault(in)" internal command the external command prevents an "as_fault(in)" internal command from being automatically executed by the operating system.

2. A method of accessing data stored in a memory, the memory having real addresses and virtual addresses associated therewith, the memory being controlled by an operating system, the operating system responding to external commands and having internal commands associated therewith, comprising the steps of:

generating a translation table showing relationships between real addresses and virtual addresses in the memory;

causing the translation table to be retained in the memory; and providing to the operating system an external command causing the operating system to begin executing an internal command to lock a portion of the translation table in the memory;

wherein the external command causes the operating system not to permit over-writing a portion of the translation table without a further external command and the operating system is a UNIX operating system and the external command prevents an "as_fault(out)" internal command from being automatically executed by the operating system.

* * * * *